United States Patent Office 3,383,507
Patented May 14, 1968

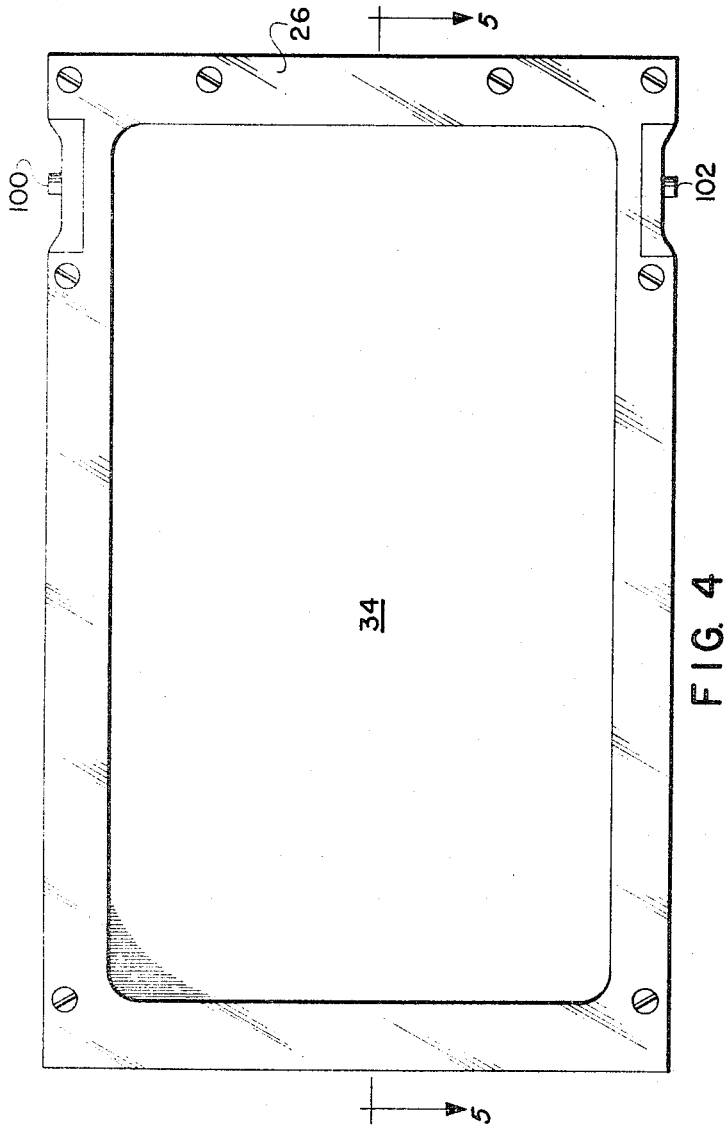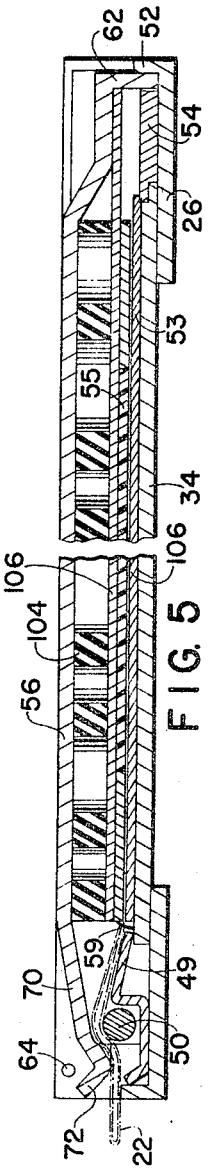

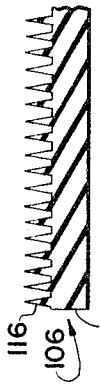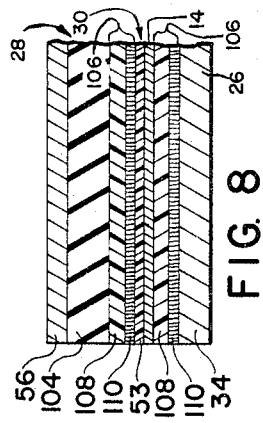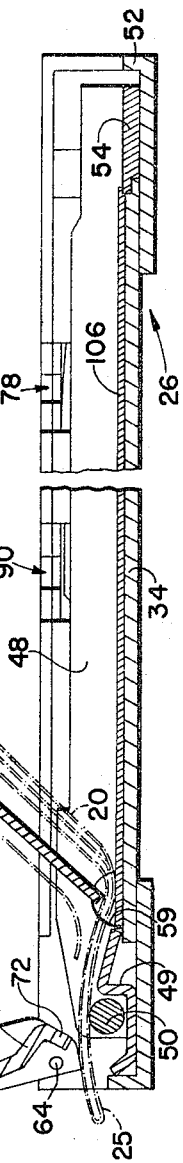

3,383,507
X-RAY FILM CASSETTE HAVING MEANS FOR PERMITTING SLIDABLE MOVEMENT OF THE FILM WITH RESPECT TO THE CASSETTE
Robert D. Brackett, Wakefield, Herman E. Erikson, Winchester, and Philip E. Young, Scituate, Mass., assignors to Polaroid Corporation, Cambridge, Mass., a Corporation of Delaware
Filed July 12, 1965, Ser. No. 471,090
2 Claims. (Cl. 250—68)

ABSTRACT OF THE DISCLOSURE

The present application relates to a cassette, including separately pivotally mounted cover and intensifying screen elements and releasable latching means, for making ready and holding a photosensitive film material for exposure and, after exposure, rendering it in a condition protected from ambient light. Resilient biasing means are provided of a quality capable of both holding the film material firmly positioned for exposure but permitting slidable movement of a protective covering envelope relative thereto. A non-linear path terminating in an aperture for partial slidable removal of the envelope preliminary to the exposure is formed at an end of the cassette adjacent to the separate pivotal means mounting the cover and intensifying screen. The indirect path and aperture, thus formed, when taken in conjunction with the material of the envelope per se, prevent the entrance of ambient light to the film material when uncovered for exposure.

---

A well-known method of making radiographs through exposure of a suitable photographic film to an X-ray beam involves processing of the exposed film according to the diffusion-transfer process. Radiographic packets suitable for carrying out such a process normally include a photosensitive sheet capable of recording a latent image when exposed by impinging an X-ray beam on an intensifying screen with which the sheet is in contact, a second sheet capable of receiving a positive transfer print from the photosensitive sheet, and a rupturable container carrying a liquid processing agent for distribution between the two sheets to effect the necessary processing and transfer steps. Several types of such radiographic packets are presently commercially available and include the types designated as 3000X, 3001X and TLX manufactured by Polaroid Corporation of Cambridge, Mass.

Cassettes for holding radiographic packets of the aforementioned type have also been designed and include those shown in U.S. Patents 2,709,223 of Bachelder et al. and 2,726,337 of Stava et al. Such cassettes are designed to allow loading of the packet in lighted surroundings and include provisions for allowing withdrawal from the cassette of an opaque envelope which initially encloses the photosensitive sheet after the packet has been loaded in the cassette. Pressure-applying means are provided to insure close contact between the photosensitive sheet and the intensifying screen within the cassette during exposure. Further means are provided to decrease this pressure when desired to allow withdrawal of the aforementioned envelope from the closed cassette without excessive friction, while still maintaining the interior of the cassette in lighttight condition. Such means involve, of course, manual movement of certain portions of the cassette both during the loading operation and when the packet is to be removed from the cassette.

The present invention contemplates a novel cassette construction which will be illustrated and described in an embodiment designed to utilize film packets of the self-developing type referred to above. However, many other types of X-ray cassettes include an intensifying screen and require means for urging the surfaces of the screen and photosensitive sheet into intimate contact during exposure. Since the present invention has as a principal object the provision of novel and improved means for insuring good screen-to-negative contact, it will be understood that the cassette may be constructed in other embodiments, having application with film units, or single photosensitive sheets, other than those of the self-developing type.

The cassette of the present invention includes generally planar, rectangular, rigid base and cover members which may be moved to a closed position, in superposed relation with an intensifying screen therebetween. The photosensitive sheet to be exposed is placed in contact with the X-ray sensitive surface of the screen and, when the latch means which retain the cassette in the closed position are engaged, resilient means exert a substantially uniform pressure to urge the entire opposing surfaces of the screen and negative into close contact. These resilient means include one or more layers of pile or flocked fabric of the type having fibers extending perpendicular to the base layer. The layers are so arranged that in the closed position of the cassette the individual fibers are flexed from their natural, essentially straight position. This flexing of the fibers exerts the required pressure and the close, essentially continuous, spacing of the fibers insures good screen-to-negative contact in areas of slight surface irregularities as well as over the generally planar portions of the two surfaces. Other resilient means, such as a layer of sponge-like material, may be used for urging the fabric toward contact with the desired portions when the cassette is closed.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 4 is a top plan view of the cassette of FIGURE 1;

FIG. 5 is a side sectional view on the line 5—5 of FIG. 4;

FIG. 6 is a side sectional view, as in FIG. 5, showing the cassette in the open position;

FIGS. 7a and 7b are fragmentary, enlarged, side sectional views of two embodiments of one portion of the cassette; and FIG. 8 is a fragmentary, enlarged, side sectional view of the cassette in the closed position with a photographic negative therein.

Figure 1:
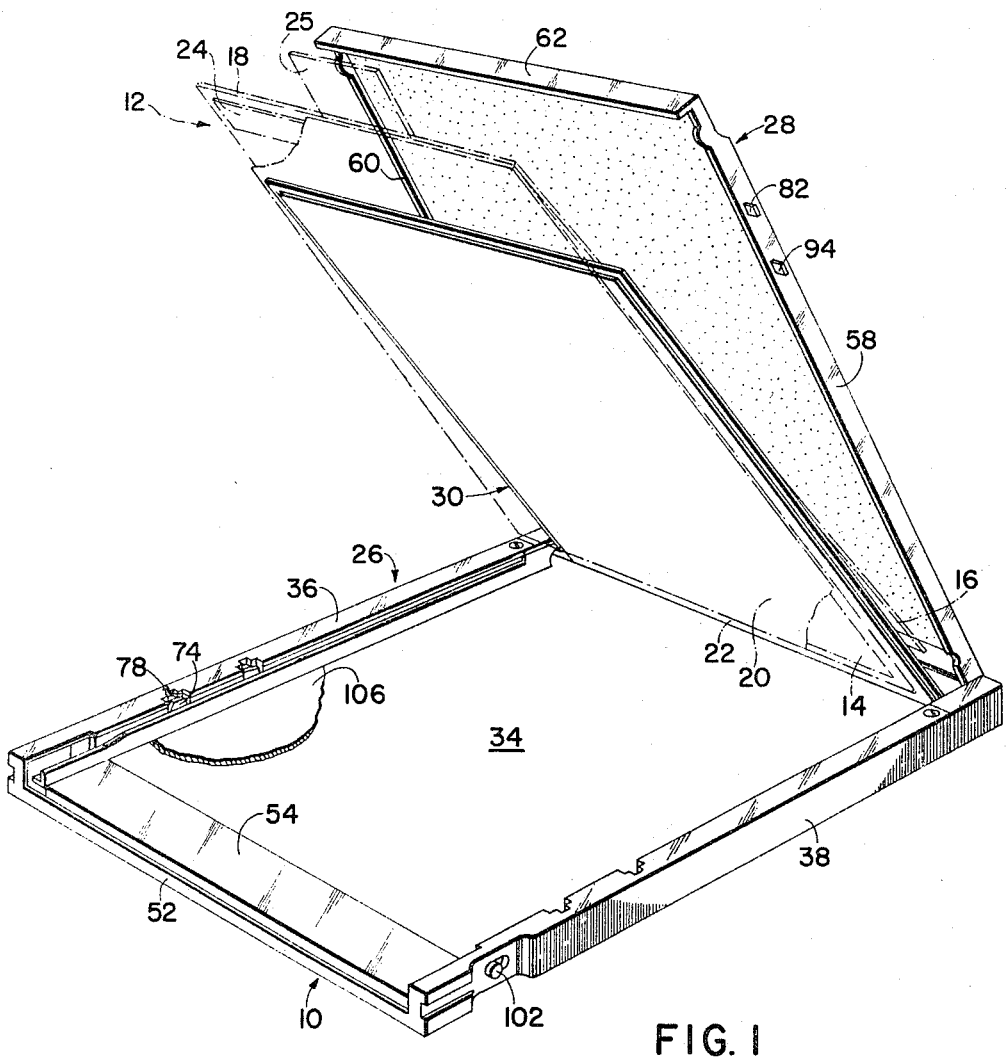
FIGURE 1 is a perspective view of one embodiment of the cassette of the present invention shown in the open position with a radiographic film packet being loaded therein.

Referring now to the drawings, in FIGURE 1 is shown the cassette of the invention, designated generally by the reference numeral 10, with a representative film packet, designated generally by the reference numeral 12, of a type suitable for use in the cassette. Film packet 12 is of the self-developing type intended to be used in carrying out a diffusion transfer process, and especially adapted for use in X-ray photography. Although film packet 12 is shown somewhat diagrammatically, specific examples of commercial embodiments thereof have been previously mentioned herein, and it will be understood that the particular construction thereof forms no part of the present invention, and that the invention may be practiced with other film units or single sheets. Packet 12 includes a pair of liquid confining layers 14 and 16 which are hinged together at one end 18, whereby they may be arranged in overlying relation or may be spread apart with respect to one another. Layer 14 includes a photosensitive area over at least a portion of the surface thereof which faces layer 16 and is initially enclosed in an opaque envelope 20 to permit handling of packet 12 in lighted surroundings without exposure or fogging of the photosensitive material. Layer 16 includes means for receiving, on the surface thereof facing layer 14, a positive transfer image by means of the well-known diffusion transfer process. Suitable leader means, not shown in detail, are provided in known fashion for hingedly attaching layers 14 and 16 and for maintaining the interior of envelope 20 in a lighttight condition. According to the usual construction of such packets, envelope 20 is closed at the sides and at end 22 while being open at the opposite end where the aforementioned means for maintaining the envelope in a lighttight condition are provided. Rupturable container 24 is positioned between layers 14 and 16 at or near hinged end 18. The container carries a supply of a suitable processing liquid which may be released from the container by the application of a compressive force thereto and spread between layers 14 and 16. Leader or tab 25 extends from one end of film packet 12 and also extends outside cassette 10 to serve as a means for withdrawing the film packet after exposure from one side of the cassette, hereafter termed the leading side or end.

Photosensitive assemblies such as those illustrated herein make use of the principles of a transfer process, as previously mentioned. These principles, as well as specific film structures suitable for use in this invention, are set forth in U.S. Patents Nos. 2,543,181, 2,544,268, 2,634,886, 2,603,565, 2,647,056, 2,565,378, all to Edwin H. Land, said Patents Nos. 2,544,268, and 2,565,378, being specific to film assemblies especially adapted for X-ray photography. These various patents include detailed descriptions of film assemblies which employ a liquid-confining layer having a photosensitive area and a liquid-confining layer in the nature of a print-carrying element which are adapted to contain all of the photographic materials needed to process the assembly. Also, the said patents are detailed as to containers for holding processing materials and further include descriptions of liquid processing compositions usable with film assemblies including, in Patents Nos. 2,544,258 and 2,565,378, a liquid processing composition employable to develop a negative without forming a positive image. The practices, photographic materials and compositions described in said patents are generally suitable for carrying out the present invention.

Cassette 10 includes three principal sections, designated generally as base member 26, cover member 28 and intensifying screen member 30. Both cover member 28 and screen member 30 are mounted upon base member 26 for pivotal movement with respect thereto about suitable hinged connections as described more fully hereinafter. The three principal sections of cassette 10 are generally planar in shape and may be moved about their mutual hinged connections between an open position, such as that shown in FIGURE 1, and a closed position, wherein the three sections are in closely superposed relation.

Figure 2:
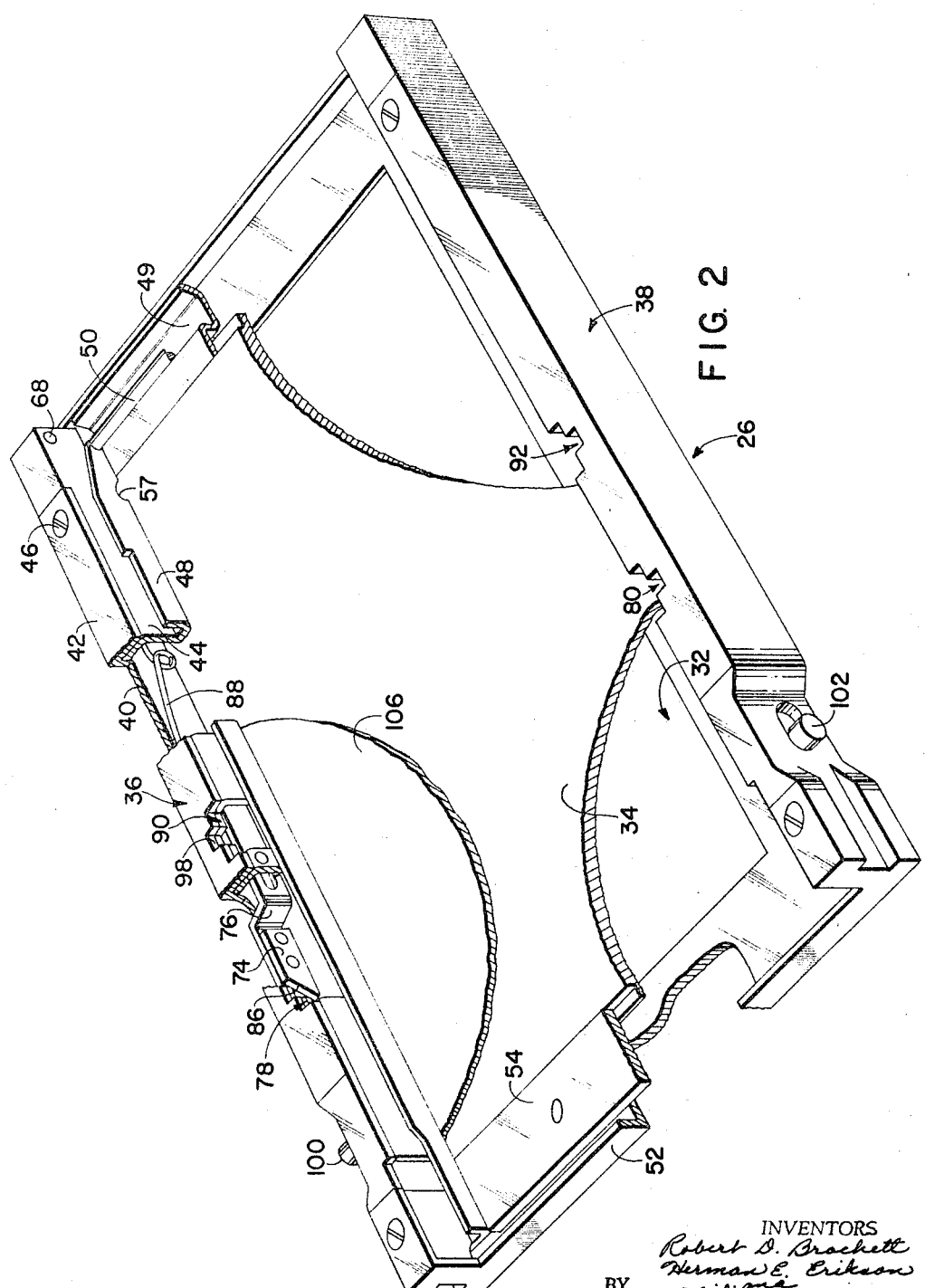
FIG. 2 is a perspective view, with portions broken away, of certain elements of the cassette of FIG. 1.

Base member 26 is of rigid construction, preferably formed of a suitable metal, and includes a centrally disposed, generally rectangular opening 32 (FIG. 2), which is covered by a sheet of material 34 which has the property of being opaque to visible and near visible light while allowing the passage of X-rays, such as Bakelite, for example. Side members 36 and 38 extend the length of base 26 between the end at which cover 28 and screen 30 are mounted and the opposite end. Although certain portions of only one of the side members may be shown in certain figures, the two members and other elements associated therewith are essentially identical in construction and it will be understood that descriptive matter pertaining to either of the side members applies to the other in the same manner. With reference to FIG. 2, it will be noted that side member 36 includes outer wall 40, upper wall 42 and inner wall 44 defining a hollow enclosure along the side of base 26. Upper wall 42 is preferably formed, as shown, by joining together overlapped extensions of outer wall 40 and inner wall 44. Thus, the outer and inner walls are formed from separate members which may be joined by removable means such as one or more screws 46 to allow access to the hollow interior of side member 36. Inner wall 44 of side member 38 is extended inwardly and upwardly to form rail 48, substantially parallel and in slightly spaced relation to inner wall 44, thereby forming a channel between the double walls 44 and 48. Wall member 49 and roller 50 are mounted to extend across base 26 near the hinged connection therewith of cover 28 and screen 30. Base 26 further includes lip 52 extending between side members 36 and 38 across the end opposite the aforementioned hinged connections. Plate 54 is secured to the inside of base 26 and assists in holding material 34 in its covering relation to opening 32. It will be noted that a relatively narrow space is provided between opposing surfaces of lip 52 and plate 54, thus extending the channel along the sides to include the leading edge of cassette 10.

Screen member 30 includes a rectangular portion on the surface thereof which faces base 26 adapted to emit radiation within the visible spectrum when struck by X-rays. A number of materials, most commonly phosphors, are used for such purposes. The phosphor, or other such X-ray sensitive material, is supported on a base material, indicated at 53 in the drawings accompanying the present disclosure. The screen of cassette 10 preferably comprises a fluorescing material carried on a relatively thin flexible base layer such as a suitable plastic. Base 53 in turn is supported by a rectangular support frame 55, made of a thin sheet metal, for example, having a centrally disposed opening, i.e., the material of frame 55 is cut out in the center to add to the flexibility thereof. Frame 55 includes projecting ears (not shown) at two corners thereof which extend into openings 57 (FIG. 2) and 59 (FIG. 5) in side members 36 and 38, respectively, thus forming the aforementioned pivotal mounting for screen member 30. Openings 57 and 59 are somewhat larger than the ears on frame 55 so that the pivotal mounting is rather loose and screen 30 may be moved a short distance laterally with respect to base 26, as well as pivotally.

Figure 3:
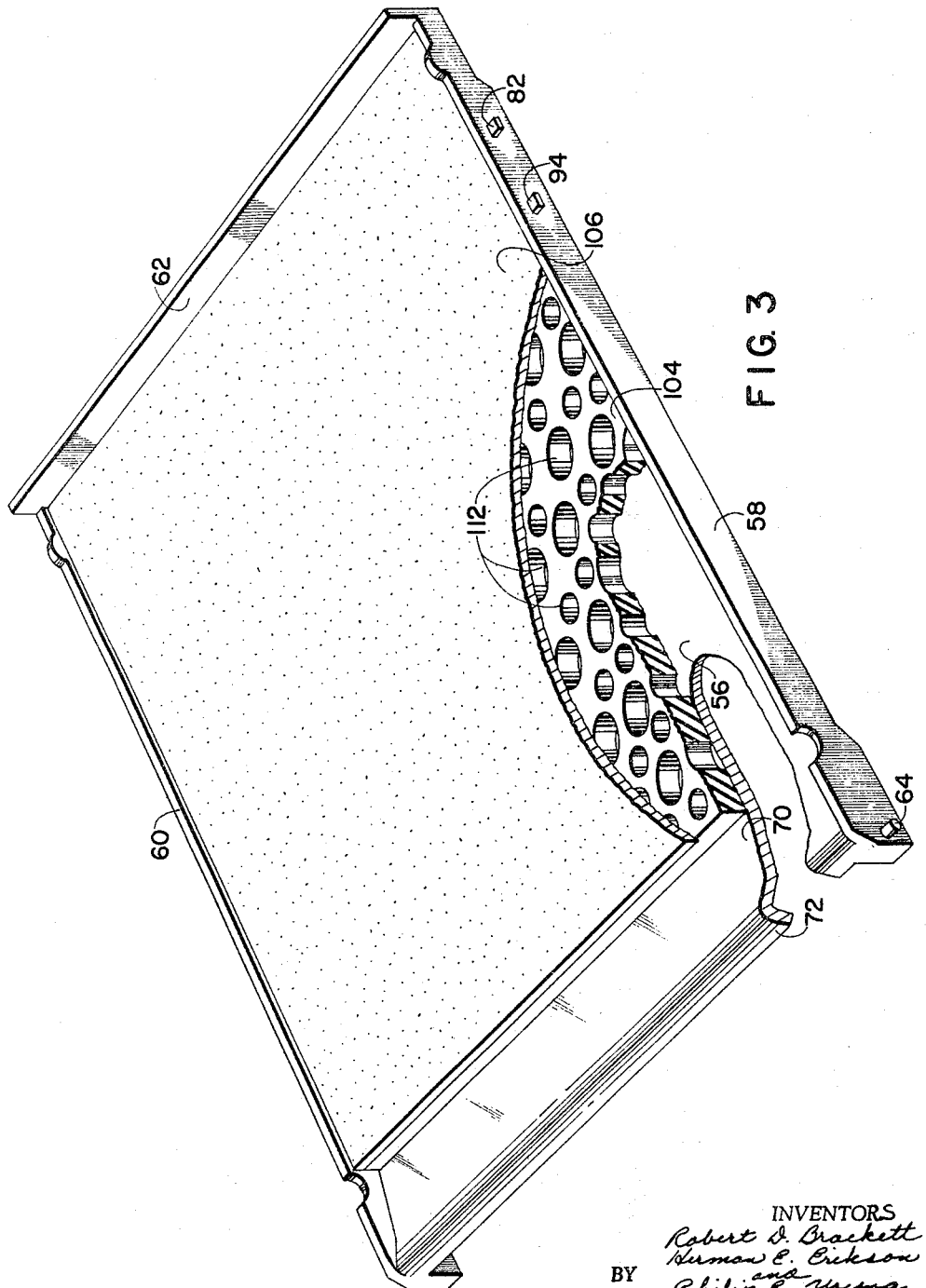
FIG. 3 is a perspective view, with portions broken away, of other elements of the cassette.

Referring now to FIG. 3, there is shown a portion of the interior (i.e. the surface which faces base 26 when cassette 10 is closed) of cover 28. Cover 28 includes relatively flat plate 56 bounded on each side by walls 58 and 60 and across the end opposite the hinged connection of the cover with the base by wall 62. Walls 58, 60 and 62 extend a short distance perpendicularly inward from plate 56 and are preferably formed integrally therewith. The hinged connection of cover 28 with base 26 may be conveniently and economically constructed by means of pins, such as that shown at 64, which extend into openings, such as that shown at 68 (FIG. 2) in side members 36 and 38. Thus, pin 64, and the corresponding pin on the other side of cover 28, define a pivotal axis about which the cover may be moved with respect to base 26.

The end of plate 56 between the hinged mounting of cover portion 28 is offset at a slight angle to the major surface of plate 56. That is, plate 56 may be said to define a substantially flat, rectangular portion of cover member 28 which is adapted to be moved about a pivotal axis to a closed position with respect to base 26. Portion 70 of cover member 28 extends out of the general plane of plate 56 toward base member 26 when the cassette is in the closed position, as shown in FIG. 5. End portion 72 of cover member 28 extends back away from base portion 26, i.e., in the opposite direction from portion 70.

Cover member 28 and base portion 26 are so dimensioned and arranged for relative movement that walls 58, 60 and 62 of the cover member extend into the previously described channel formed by the double wall means around the corresponding three sides of the base member. This arrangement is effective to form a change of direction, or labyrinth, light seal around these three sides of the cassette. It is further necessary, of course, to provide means for effectively preventing entry of light into the cassette along the fourth side of the cassette, through which the pivotal axis of the cover and base members passes. In the illustrated embodiment of the cassette, provision is further made for withdrawing a portion of the film assembly from the interior of the cassette through the fourth side while still maintaining the interior of the cassette in a lighttight condition. It is also desirable to effect such withdrawal without disturbing the closed position of the cassette, such as by relieving frictional engagement between portions of the cassette and the film assembly position therein.

As shown in FIG. 6, the cassette is in the open position with base member 26, cover member 28 and screen support member 30 moved away from superposition with one another. Roller 50 is mounted, in the manner previously described, upon base member 26 between, and parallel to, the pivotal axes of cover member 28 and screen member 30. As film packet 12 is loaded into the cassette, closed end 22 of envelope 20 passes between base member 26 and the edge of screen member 30 about which the latter is pivotally movable. End 22 of the envelope then passes between roller 50 and the edge of cover member 28 about which the latter is pivotally movable, to extend outside the cassette along the previously mentioned fourth side thereof. Due to the relative arrangement of the pivotal axis of cover member 28 and wall portions 70 and 72 thereof, these wall portions are moved to provide a wider space between roller 50 and the fourth side of the cover member when cassette 10 is moved to the open position. As seen in FIG. 6, relative positions of the various elements when the cassette is in the open position cooperate to form an opening along the fourth side of the cassette which facilitates insertion therethrough of end 22 of envelope 20.

After insertion of end 22 of envelope 20 through the fourth side of the cassette, as described above, and positioning of layer 16 of the film packet on the opposite side of screen member 30 from envelope 20 and layer 14, cassette 10 may be moved to the closed position. This is effected merely by moving cover member 28 and screen member 30 about their respective pivotal axes into superposed relation with the base member 26. Cassette 10 is shown in FIG. 5 in the closed position with end 22 of envelope 20 extending therefrom for manual withdrawal of the envelope from the cassette by pulling in the direction indicated by the arrow. It will be noted that one surface of envelope 20 will ride on roller 50 as the envelope is withdrawn. This will greatly reduce any frictional resistance between the cassette and evelope, thus facilitating withdrawal of the latter. Also, the arrangement of wall portions 70 and 72 with respect to roller 50 and wall member 49 is seen to be such that there is no direct light path into cassette 10 through the envelope withdrawal end thereof. Thus, a labyrinth type light seal is also formed at this end of the cassette, making the interior thereof essentially lighttight. This condition is enhanced, of course, by the use of non-reflective materials or coatings on the interior portions adjacent the boundaries of the cassette.

Latch means are provided for maintaining cassette 10 in the closed position shown in FIG. 5. The latch means are arranged within the hollow interiors of side members 36 and 38, and include latch plate 74 and slide 76 (FIG. 2). Slide 76 is mounted for reciprocal sliding movement within side member 36 by any convenient means such as rivets or studs extending inwardly from a wall of the side member through elongated openings in slide 76. Appropriate spring means (not shown) are provided for urging slide 76 toward the leading edge of cassette 10. Openings 78 and 80 are provided in the upper walls of side members 36 and 38 in registration with the latch plates when the latter are in the forward position. Pin or lug 81 extends outwardly from wall 58, and a similar pin extends from the same position on wall 60, of cover member 26, these pins being arranged to pass through openings 78 and 80 when the cassette is moved to the closed position. The pin extending from wall 60 will contact sloping surface 86 of latch plate 74 and cam the latch plate and slide rearward as the cover and base members are moved together. As the pin passes the bottom edge of the latch plate, the spring biasing means will again move the latch plate and slide forwardly over the pin on the cover so that the cover and base members are held in the closed position.

Also provided in the hollow interiors of side members 36 and 38 are a pair of torsion springs, one of which is shown in FIG. 2 and designated by the reference numeral 88. A second pair of openings 90 and 92 are provided in the upper walls of the side members in registration with a second pair of pins, one of which is shown at 94, on cover member 26. Portion 98 of spring 88 extends across opening 90, and spring 88 is so arranged within side member 38 that portion 98 is biased toward movement into engagement with the inner surface of upper wall 42 of side member 36. When cassette 10 is moved into the closed position, pin 94 and the corresponding pin on wall 60 contact the portion of the torsion spring extending across openings 90 and 92 and deflect the spring downwardly. Thus, the spring exerts an upward force on the pins, urging the cover and base members apart, i.e., away from the closed position, wherein they are retained by the previously described latch means.

Buttons 100 and 102 extend outwardly through elongated openings in side members 36 and 38, respectively. Button 100 is fixedly attached to a forwardly extending portion of slide 76 and button 102 is likewise attached to the slide within side member 38. Thus, rearward movement of buttons 100 and 102 is effective to move the slides and latch plates rearwardly out of engagement with the pins on cover 28. Upon such movement of buttons 100 and 102 and consequent release of the latch means, torsion spring 88, and the corresponding spring within side member 38, moves cover member 28 a short distance about its pivotal mounting away from the closed position. This relative movement of the cover and base members is sufficient to allow withdrawal from the leading side of the cassette of film packet 12.

Means are provided within cassette 10 for urging the intensifying screen and photosensitive layer 14 into close engagement over the opposing surfaces thereof. Such means are illustrated as comprising a layer of sponge-like material 104, such as foam rubber, and a layer of a pile or flocked fabric 106. Material 106 preferably includes a base layer 108 having a plurality of closely spaced, flexible fibers 110 extending perpendicularly outward therefrom. An example of such material is that manufactured under the trade name Vertipile by Vertipile Incorporated of Lowell, Mass. In one commercially available form, preferred for use in the present invention, base 108 comprises a plastic such as Mylar and fibers 110 are of a synthetic material such as nylon or rayon. Layer 104 is secured in covering relation to the interior surface of cover member 28 and layer 106 is secured in covering relation to layer 104 with the aforementioned flexible fibers extending away from the cover member. The thickness of layer 104, and the length of the fibers on layer 106, are such that when cassette 10 is in the closed position, layer 104 is compressed and the fibers are somewhat flexed by contact with the opposing surface within the cassette. Thus, the natural tendency of the material of layer 104 and the fibers of layer 106 to return to their natural, uncompressed and unflexed positions will exert a substantially uniform pressure against screen member 30, urging the latter into engagement with the portion of film packet 12 which is positioned between the screen and base member 26. Layer 104 may be provided with cutout portions 112 in any desired number and spacing to provide the desired compressive force when the cassette is in the closed position.

In FIGS. 7a and 7b are shown two alternate embodiments of suitable structures for layer 106, the same reference numeral being used for both embodiments. FIG. 7a shows in greater detail the previously described embodiment, which is preferred since the material is commercially available, relatively inexpensive, and readily adapted for use in the present invention. Fibers 110 are applied to base layer 108 to stand substantially perpendicular thereto and then sheared to the desired height. The material is uniform as to density of fibers, weight, color, etc., from one surface area to another, thus making it especially suitable for use in X-ray photography since any tendency of the material to attenuate the X-ray beam, in cases where the beam passes through the material before striking the intensifying screen, will be uniform over the entire area of the radiograph. FIG. 7b shows another suitable embodiment wherein the base layer 114 and perpendicularly extending fibers 116 may be formed as an integral unit from a naturally resilient material, such as a suitable rubber or certain plastic compositions, for example.

In FIG. 8 is shown a fragment of cassette 10 in the closed position with photosensitive sheet 14 therein. Layer 104 is secured to the inner side of plate 56 of cover member 28. Base 108 of material 106 is secured to layer 104 with fibers 110 extending into contact with the rear, or non-sensitive surface of base 53 of screen member 30. The fluorescing, or X-ray sensitive surface of the screen, preferably faces the photosensitive surface of negative 14, although the latter may also be reversed and exposed through a transparent base thereof. A second layer of material 106 is also secured in covering relation to material 34 of base member 26, a fragment of this layer being shown also in FIGS. 1 and 2. In this case, base layer 108 faces negative 14 and fibers 110 bear against material 34, although material 106 is secured in covering relation thereto. The resilient force applied by the flexing of fibers 110 is the same in either case and the low friction of the Mylar base facilitates withdrawal of envelope 20, in cassettes wherein film packets such as those previously described are used. In such packets, of course, the second or print-carrying layer 16 of the assembly would be positioned between screen 30 and the upper layer of material 106, although none is shown in FIG. 8 to illustrate the practice of the invention with a single negative sheet only.

It should also be noted that the flexibility of screen member 30 also adds to the ability of the cassette to achieve good negative-to-screen contact. Base 53 may be disposed within the cutout area of support frame 55, as shown, or may be attached to one surface of the frame, with the cutout area filled with an additional layer. For example, another layer of material 106 may be disposed in the cutout area of the screen with the fibers facing either cover member 28 or the back of base 53 of the screen. In applications of the invention where an opaque envelope is to be withdrawn from the cassette, it is preferred that openings 112 be included in layer 106 so that the rate of loading provided thereby may be closely controlled over the entire surface area so that sufficient force is applied for the required negative-to-screen contact while keeping the friction resistance to envelope removal to a minimum.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A cassette for making ready and holding during exposure a flexible sheet of photosensitive film material contained in a manually withdrawable envelope open at one end, said cassette comprising, in combination:
   (a) a rigid base member;
   (b) first pivotal means mounting a rigid cover member movable with respect to said base member toward and away from a closed position, wherein said members are superposed with the opposing surfaces thereof substantially parallel and in spaced relation;
   (c) second pivotal means carrying an intensifying screen positioned between said base and cover members when the latter are in said closed position;
   (d) latching means adapted to releasably hold said base and cover members at closed position;
   (e) means providing at latched condition of said base and cover members a non-linear path adjacent to said first and second pivotal means and terminating in an aperture formed in an end of said base member proximate to said pivotal means for partial slidable withdrawal and return of said envelope to permit said exposure of the film material while blocking the entrance of ambient light rays; and
   (f) resilient biasing means secured in covering relation to at least one of said opposing surfaces of said cover and base members, said means having given resiliency characteristics for biasing said photosensitive film material firmly and uniformly against said intensifying screen at said latched condition while permitting said slidable movement of said envelope without dislodging said film material.

2. The invention according to claim 1 wherein said resilient means comprises a material having a base layer and a plurality of closely spaced, flexible fibers arranged to extend perpendicularly from said base layer.

References Cited

UNITED STATES PATENTS 1,933,652  11/1933  Boldingh _____ 250—68

FOREIGN PATENTS 59,393  4/1947  Germany.
205,657  9/1939  Germany.
1,269,184  7/1961  France.

RALPH G. NILSON, *Primary Examiner.*

A. L. BIRCH, *Assistant Examiner.*